United States Patent [19]
Martinez

[11] 3,971,140
[45] July 27, 1976

[54] KEYBOARD INTERCEPTOR ("INTERMEGRAF")

[76] Inventor: Arcadio Martinez, 140 SW. 12 Ave. (Apt. 11), Miami, Fla. 33130

[22] Filed: Feb. 28, 1975

[21] Appl. No.: 505,754

[52] U.S. Cl. .................................................. 35/5
[51] Int. Cl.² ...................................... G09B 13/00
[58] Field of Search ............... 40/341; 35/5, 6, 1; 248/441, 442.2, 452, 454, 457

[56] References Cited
UNITED STATES PATENTS

| | | | |
|---|---|---|---|
| 1,277,169 | 8/1918 | Anderson | 35/5 X |
| 1,370,737 | 3/1921 | Furrey | 248/442.2 |
| 1,685,041 | 9/1928 | Binkele | 248/452 |

FOREIGN PATENTS OR APPLICATIONS

| | | | |
|---|---|---|---|
| 377,561 | 6/1964 | Switzerland | 35/5 |
| 368,949 | 6/1963 | Switzerland | 35/5 |

Primary Examiner—John H. Wolff
Attorney, Agent, or Firm—Clarence A. O'Brien; Harvey B. Jacobson

[57] ABSTRACT

An upright standard is provided having front and rear sides and mounting means on its lower end for releasable mounting from a support upon which a typewriter may be placed. A generally horizontal panel structure is mounted from the upper end portion of the standard and projects to the rear of the standard for overlying the keyboard of a typewriter disposed on the support immediately to the rear of the standard and for blocking the area of the keyboard from the area of forward and downward vision of a person seated in front of the support for typing on the typewriter. The horizontal panel structure includes a rear marginal edge portion and a panel extension extends along the rear marginal portion of the panel structure and is supported therefrom for adjustable angular displacement relative to the panel structure about an axis at least closely adjacent and generally paralleling the rear marginal edge portion of the panel structure. Also, the upright standard includes a horizontal transverse bar supported therefrom intermediate its upper and lower ends and the bar is vertically adjustable along the standard with the opposite end portions of the bar projecting outwardly from the corresponding sides of the standard. The bar is provided for establishing the minimum desirable elevation of the wrists of a person typing on the typewriter.

5 Claims, 4 Drawing Figures

KEYBOARD INTERCEPTOR ("INTERMEGRAF")

BACKGROUND OF THE INVENTION

Various different forms of teaching aids have been provided to assist in teaching the correct manner of typing on a typewriter. However, most of these previous devices have, for one reason or another, not been complete insofar as providing structure for determining the proper hand position of a person seated at a typewriter and also structure for blocking both the keyboard of the typewriter and the copy being produced by the typewriter from the vision of the student using the typewriter.

SUMMARY OF THE INVENTION

The teaching aid for typewriting of the instant invention includes structure whereby it may be readily supported in proper position relative to a desk supported typewriter and utilized in maintaining the hands of the operator of the typewriter at the proper elevation while at the same time blocking the keyboard and copy being produced by the typewriter from the view of the user.

The main object of this invention is to provide an aid for use in teaching typing which may be utilized in maintaining the hands of the typing student at the proper elevation relative to the associated typewriter.

Another important object of this inventon, in accordance with the immediately preceding object, is to provide a typing aid whereby a student will have his or her vision of the keyboard of the associated typewriter blocked.

Yet another important object of this invention is to provide a teaching aid including structure whereby the student's vision of the copy being produced by the typewriter will be blocked.

A further object of this invention is to provide a teaching aid including adjustable features thereof which will enable the vision blocking portions thereof to be adjusted so as to compensate for different typewriters and students of different sizes.

A further object of this invention is to provide a teaching aid constructed in a manner whereby it may be readily removably mounted from an associated typewriter support stand or desk.

A final object of this invention to be specifically enumerated herein is to provide a typewriting teaching aid which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
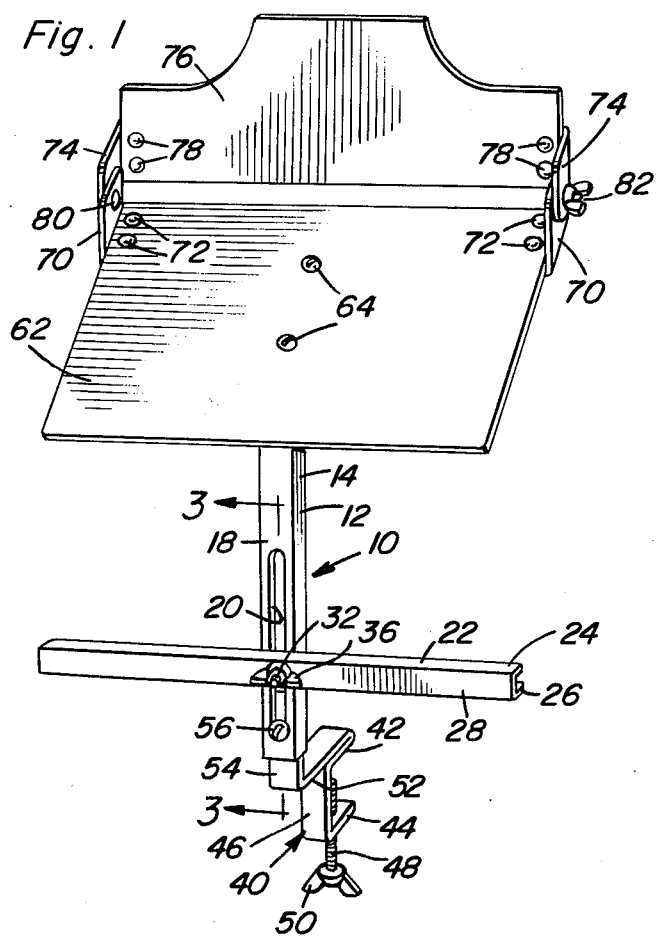
FIG. 1 is a perspective view of the teaching aid of the instant invention.
Figure 3:
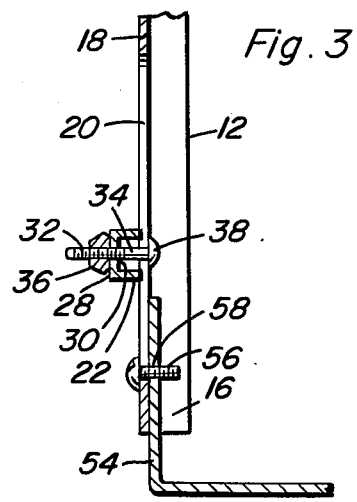
FIG. 3 is an enlarged fragmentary vertical sectional view taken substantially upon the plane indicated by the section line 3—3 of FIG. 1.

Referring now more specifically to the drawings, the numeral 10 generally designates the typewriting teaching aid of the instant invention which includes an upright channel-shaped standard 12 including opposite side flanges 14 and 16 interconnected along one pair of corresponding longitudinal edge portions by means of a bight portion 18 extending therebetween.

The lower end portion of the standard 12 has a longitudinal slot 20 formed in its bight portion 18 and a horizontal crossbar 22 in the form of a horizontally and rearwardly opening channel member is supported from the slotted portion of the standard 12. The crossbar 22 includes upper and lower horizontal flanges 24 and 26 interconnected along their corresponding forward longitudinal marginal edge portions by means of an upstanding bight portion 28 extending therebetween and the central portion of the bight portion 28 is apertured as at 30. A headed fastener 32 has its shank portion 34 secured through the slot 20 and the aperture or bore 30 by means of a wing nut 36, the head 38 of the fastener 32 being received within the channel member or standard 12 between the opposite side flanges 14 and 16 thereof.

A horizontally and rearwardly opening C-shaped clamp assembly referred to in general by the reference numeral 40 is supported from the lower end of the standard 12. The clamp assembly 40 includes upper and lower horizontal arms or jaws 42 and 44 interconnected at their rear ends by means of an upstanding bight portion 46 extending therebetween. The jaw 48 has an upstanding threaded shank 48 threadedly secured therethrough intermediate its opposite ends and the upper end of the shank 48 opposes the underside of the jaw 42, the lower end of the shank 48 being equipped with a finger-engageable head for manually imparting rotational torque to the shank 48.

The rear end of the jaw 42 includes a rearward extension 52 which terminates rearwardly in an upwardly directed flange 54 telescoped into the lower end of the channel-shaped standard 12 and a headed fastener 56 is secured through the lower end of the slot 20 and threadedly engaged through a threaded bore 58 formed in the upper end portion of the flange 54 telescoped into the lower end of the standard 12. Accordingly, the standard 12 may be vertically adjusted relative to the clamp assembly 40 and the crossbar 22 may be vertically adjusted relative to the standard 12.

Figure 4:
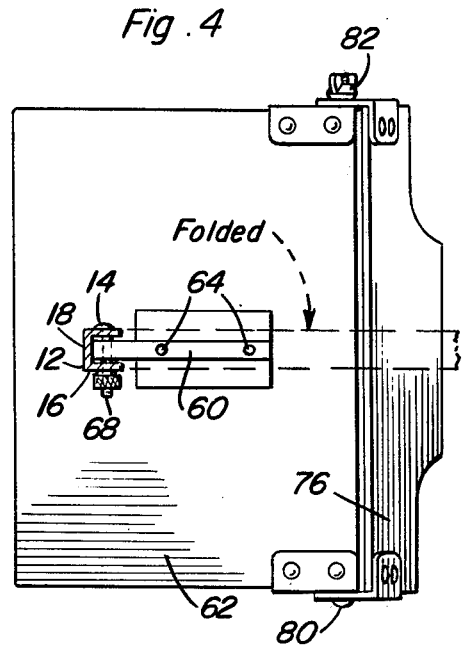
FIG. 4 is a bottom plan view of the aid with the lower portion of the standard thereof being broken away and illustrated in horizontal section.
Figure 2:
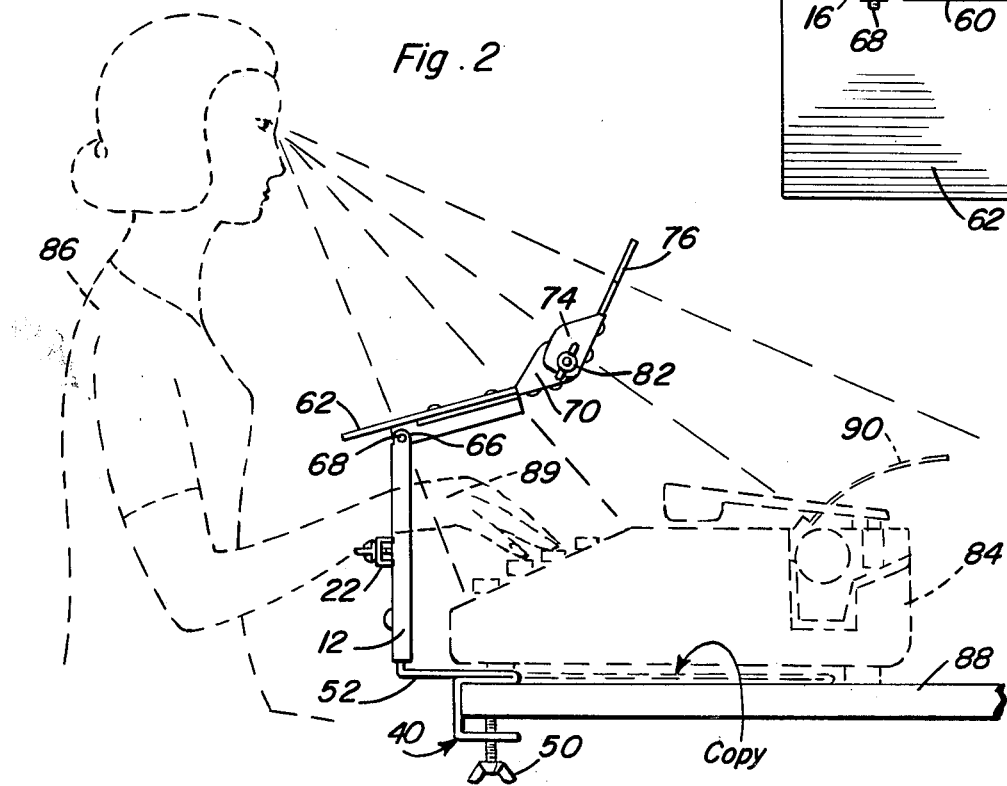
FIG. 2 is a side elevational view of the teaching aid as mounted from a suitable typewriter support, an associated typewriter and student being illustrated in phantom lines.

With reference now more specifically to FIGS. 2 and 4 of the drawings, it may be seen that a channel-shaped mounting brace 60 is secured to the underside of a generally horizontal but slightly rearwardly and upwardly inclined panel structure 62 by means of fasteners 64. The upper terminal end of the bight portion 18 is omitted and the standard 12 thereby defines a pair of mounting ears 66 at the upper terminal end of the standard 12 between which the front end of the mounting brace 60 is pivotally attached by means of a pivot fastener 68 which may be tightened in order to maintain the panel structure 62 in adjusted angularly displaced positions relative to the upper end of the standard 12.

A pair of apertured mounting flanges 70 are secured to the opposite rear corners of the panel structure 62 by means of suitable fasteners 72 and a similar pair of mounting flanges 74 are secured to the opposite side marginal edge portions of an extension panel 76 by means of fasteners 78. One pair of corresponding flanges 70 and 74 are pivotally secured together by means of a pivot fastener 80 and the other pair of flanges 70 and 74 are pivotally secured together by means of a pivot fastener 82 which may be tightened in order to maintain the extension panel 68 in adjusted angularly displaced position relative to the panel structure 62.

In operation, a typewriter 84 to be used by a student 86 seated in front of a typewriter table 88 is placed upon the table 88 in the manner illustrated in phantom lines in FIG. 2. Then, the clamp assembly 40 is engaged with the forward marginal edge of the table 88 and the effective height of the standard 12, the angulation of the panel structure 62 and the angular positioning of the panel extension 76 is adjusted in a manner which is believed to be obvious from the foregoing description. Thereafter, the height of the crossbar 22 may be adjusted in order that the wrists 89 of the typist 86 will be at an elevation with the typist's hands properly positioned above the keyboard of the typewriter 84. Further, correct adjustment of the panel structure 62 and the panel extension 76 will cause the panel structure 62 to block the keyboard of the typewriter 84 from the forward and downward view of the typist 86 and the copy 90 being produced by the typewriter 84 from the view of the typist 86.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An upright standard having front and rear sides and mounting means on its lower end for releasable mounting from a support upon which a typewriter may be placed, a generally horizontal panel structure pivotally mounted from the upper end portion of said standard and projecting to the rear and outwardly beyond the lateral sides of the standard for overlying the keyboard of a typewriter disposed on said support immediately to the rear of and generally laterally centered relative to said standard for blocking the area of the keyboard from the area of forward and downward vision of a person seated in front of the support for typing on the typewriter, a horizontal transverse bar supported from the vertical mid-portion of said standard and vertically adjustable along the latter with the opposite end portions of said bar projecting outwardly from the corresponding sides of said standard, said bar being vertically adjustable along said standard for establishing the minimum desirable elevation of the wrists, positioned on opposite sides of said standard, of a person typing on said typewriter.

2. The combination of claim 1 wherein said panel structure includes a rear marginal edge portion, a panel extension extending along said rear marginal portion and supported therefrom for adjustable angular displacement relative to said panel structure about an axis at least closely adjacent and generally paralleling said rear marginal portion, said panel extension being adjustable as a rearward extension of panel structure for blocking the copy being typed in the typewriter from said area of vision.

3. The combination of claim 1 wherein said standard includes upper and lower sections having lower and upper ends, respectively, secured together in adjustable overlapped relation whereby the effective height of said standard, and thus the elevation of said panel structure, may be adjusted.

4. The combination of claim 1 wherein said mounting means carried by the lower end of said standard comprises a rearwardly and horizontally opening clamp structure.

5. The combination of claim 1 wherein said panel structure includes a rear marginal edge portion, a panel extension extending along said rear marginal portion and supported therefrom for adjustable angular displacement relative to said panel structure about an axis at least closely adjacent and generally paralleling said rear marginal portion, said panel extension being adjustable as a rearward extension of panel structure for blocking the copy being typed in the typewriter from said area of vision, wherein said panel structure and said panel extension include coacting means operative to realeasably retain said panel extension in adjusted angular position.

* * * * *